United States Patent [19]

Sikdar

[11] 4,360,659
[45] Nov. 23, 1982

[54] NON-CATALYZED INTERFACIAL POLYCONDENSATION POLYCARBONATE PROCESS

[75] Inventor: Subhas K. Sikdar, Clifton Park, N.Y.

[73] Assignee: General Electric Company, Schenectady, N.Y.

[21] Appl. No.: 260,874

[22] Filed: May 6, 1981

[51] Int. Cl.³ .............................................. C08G 63/62
[52] U.S. Cl. ................................... 528/196; 528/174; 528/198; 528/199; 528/201; 528/202
[58] Field of Search ......................... 528/198, 196, 199

[56] References Cited
U.S. PATENT DOCUMENTS

| | | | |
|---|---|---|---|
| 3,160,606 | 12/1964 | Dietrich et al. | 528/198 |
| 3,227,681 | 1/1966 | Conix | 528/198 |
| 3,275,601 | 9/1966 | Schnell et al. | 528/198 |
| 3,318,845 | 5/1967 | Dietrich et al. | 528/196 |
| 3,376,261 | 4/1968 | Jackson et al. | 528/198 |
| 3,879,347 | 4/1975 | Serini et al. | 528/370 |
| 3,879,348 | 4/1975 | Serini et al. | 528/196 |
| 3,989,672 | 11/1976 | Vestergaard | 528/199 |

Primary Examiner—Harold D. Anderson
Attorney, Agent, or Firm—James C. Davis, Jr.

[57] ABSTRACT

This invention relates to a non-catalyzed equilibrated interfacial polycondensation aromatic polycarbonate process comprising forming an equilibrated substantially uniform agitated two-phase admixture containing an organic phase containing an inert solvent, and an aqueous phase containing a solution of an aromatic dihydroxy compound and a strong base, adding and reacting a carbonyl halide with the aromatic dihydroxy compound to form an aromatic polycarbonate, and separating and recovering the solid aromatic polycarbonate particulate from the liquid aqueous phase.

9 Claims, No Drawings

NON-CATALYZED INTERFACIAL POLYCONDENSATION POLYCARBONATE PROCESS

BACKGROUND OF THE INVENTION

1. Field of the Invention

This invention relates to a non-catalyzed interfacial polycondensation aromatic polycarbonate process wherein the polycarbonate is formed in the aqueous phase in particulate form.

2. Description of the Prior Art

In general, interfacial polycondensation publications including "The Encyclopedia of Polymer Science", Vol. 10 (1969), "Chemistry and Physics of Polycarbonates, Polymer Reviews", H. Schnell, Vol. 9, John Wiley & Sons, Inc. (1964); "Polycarbonates", Christopher N. Fox, Rheinhold Corporation of New York, (1962); among other publications, including numerous and foreign patents, e.g., Great Britain Pat. No. 1,222,003, U.S. Pat. Nos. 3,227,681; 3,275,601; 3,318,845; 3,879,347; 3,879,348; 3,989,672; and West German Offenlegungsschrift No. 29 01 668, report generally effective interfacial polycondensation processes.

Heretofore, an interfacial polycarbonate process wherein (1) the initial two-phase reactant admixture contains a liquid inert organic solvent phase to a liquid aqueous phase—on a volume-volume (v/v) basis—range of from 0.04:1 to 0.20:1 during (2) the preparation of an aromatic polycarbonate having a weight-average molecular weight ($\overline{M}_w$) of at least about 2000 wherein the aromatic polycarbonate is formed in particulate form in the liquid aqueous phase has not been reported.

The benefits associated with the process include (1) the elimination of a nitrogen containing tertiary amine polycondensation catalyst, (2) the use of substantially reduced amounts of liquid phase inert organic solvent during the polycondensation process, and (3) the elimination or reduced use of (i) antisolvents in the separation and recovery of aromatic polycarbonate from the reaction environment, and/or (ii) steam precipitation techniques to recover any aromatic polycarbonate in solution in the organic phase—since substantially all of the polycarbonate formed precipitates in-situ in the aqueous phase in particulate form.

DESCRIPTION OF THE INVENTION

This invention embodies a non-catalyzed interfacial polycondensation aromatic polycarbonate process wherein the polycarbonate is formed in the aqueous phase in particulate form.

In general, illustratively, the uncatalyzed interfacial polycondensation polycarbonate process entails the reaction of at least one aromatic dihydric phenol with a carbonyl halide the improvement comprising carrying out the process in the absence of a polycondensation catalyst and in accordance with the following process sequence and process parameters:

(1) forming an equilibrated substantially uniform agitated two-phase admixture containing (i) an organic phase containing an inert solvent, (ii) an aqueous phase containing a solution of an aromatic dihydroxy compound, and a strong base, e.g., an alkali metal hydroxide, and optionally, a chain-stopper, having a pH of at least about 11, subject to the proviso that:

(a) the volume ratio of inert organic solvent phase to aqueous phase is within the range of from 0.04:1 to 0.20:1, and (b) the mol ratio of the base to aromatic dihydroxy compound is at least about 0.25:1, (2) adding and reacting a carbonyl halide with the aromatic dihydroxy compound to form an aromatic polycarbonate having a $\overline{M}_w$ of at least about 2000 and an $\overline{M}_w/\overline{M}_n$ of less than about 6.0, and (3) separating and recovering the solid aromatic polycarbonate particulate from the liquid aqueous phase.

The polycarbonates prepared by the process described herein are, preferably, non-sterically-hindered aromatic polycarbonates ("NSH-aromatic-PC") and include compounds well known to those skilled in the art.

The expression NSH-aromatic-PC as employed herein and in the claims includes polycarbonates containing a major portion i.e., more than 50, and frequently 90–100 mol percent of NSH-polycarbonate moieties derived from non-sterically-hindered dihydroxy aromatic compounds and a minor portion, i.e., less than 50, and frequently 0–10 mol percent of sterically-hindered (SH—) polycarbonate moieties derived from SH-dihydroxy aromatic compounds. The expression non-sterically-hindered dihydric or dihydroxy aromatic compounds or non-sterically-hindered phenols as employed herein and in the claims includes any dihydric phenol free of steric hinderance, i.e., dihydric phenols having neither hydroxy group sterically hindered by the presence of a halogen, hydrocarbon or hydrocarbonoxy group ortho-positioned relative to the hydroxy groups of a dihydric phenol. Sterically hindered is defined herein as the presence of a halogen, hydrocarbon or hydrocarbonoxy group directly bonded to each carbon atom ortho-positioned (adjacent to) the carbon atoms directly bonded to hydroxyl groups of the dihydric phenol. These NSH-dihydric phenols are well known to those skilled in the art as illustrated by D. W. Fox's U.S. Pat. No. 3,153,008 and can be illustrated by formula (I) set out hereafter:

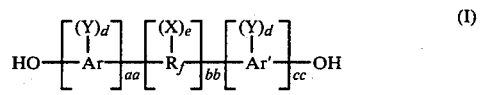

(I)

where $R_f$ is an alkylene, alkylidene including "vinylidene", cycloalkylene, cycloalkylidene or arylene linkage or a mixture thereof, a linkage selected from the group consisting of ether, carbonyl, amine, a sulfur or phosphorous containing linkage, Ar and Ar' are arene radicals, Y is bromine, chlorine or a monovalent alkyl or alkoxy group, each d represents a whole number up to a maximum equivalent to the number of replaceable hydrogens substituted on the aromatic rings comprising Ar or Ar'—subject to the proviso that when d is equal to two or more, no more than one Y group is ortho-positioned relative to an —OH group, X is bromine, chlorine or a monovalent hydrocarbon group selected from the class consisting of alkyl, aryl and cycloalkyl including mixtures thereof, e represents a whole number of from 0 to a maximum controlled by the number of replaceable hydrogens on $R_f$, aa, bb and cc represent whole numbers including 0, when bb is not zero, neither aa or cc may be zero, otherwise either aa or cc but not both may be 0, when bb is zero, the aromatic groups can be joined by a direct carbon bond.

Included in the NSH-dihydric phenols of formula (I) are, for example, the following:
resorcinol;
4,4'-dihydroxy-diphenyl;
1,6-dihydroxy-naphthalene;
2,6-dihydroxy-naphthalene;
4,4'-dihydroxy-diphenyl methane;
4,4'-dihydroxy-diphenyl-1,1-ethane;
4,4'-dihydroxy-diphenyl-1,1-butane;
4,4'-dihydroxy-diphenyl-1,1-isobutane;
4,4'-dihydroxy-diphenyl-1,1-cyclopentane;
4,4'-dihydroxy-diphenyl-1,1-cyclohexane;
4,4'-dihydroxy-diphenyl-phenyl methane;
4,4'-dihydroxy-diphenyl-2-chlorophenyl methane;
4,4'-dihydroxy-diphenyl-2,4-dichlorophenyl methane;
4,4'-dihydroxy-diphenyl-p-isopropylphenyl methane;
4,4'-dihydroxy-diphenyl-2,2-propane;
4,4'-dihydroxy-3-methyl-diphenyl-2,2-propane;
4,4'-dihydroxy-3-cyclohexyl-diphenyl-2,2-propane;
4,4'-dihydroxy-3-methoxy-diphenyl-2,2-propane;
4,4'-dihydroxy-3,3'-dimethyl-diphenyl-2,2-propane;
4,4'-dihydroxy-3,3'-dichloro-diphenyl-2-2-propane;
4,4-dihydroxy-diphenyl-2,2-butane;
4,4'-dihydroxy-diphenyl-2,2-pentane;
4,4'-dihydroxy-diphenyl-2,2-(4-methyl pentane);
4,4'-dihydroxy-diphenyl-2,2-n-hexane;
4,4'-dihydroxy-diphenyl-2,2-nonane;
4,4'-dihydroxy-diphenyl-4,4-heptane;
4,4'-dihydroxy-diphenyl phenylmethyl methane;
4,4'-dihydroxy-diphenyl-4-4chlorophenylmethyl methane;
4,4'-dihydroxy-diphenyl-2,5-dichlorophenylmethyl methane;
4,4'-dihydroxy-diphenyl-3,4-dichlorophenylmethyl methane;
4,4'-dihydroxy-diphenyl-2-naphthylmethyl methane;
4,4'-dihydroxy-tetraphenyl methane;
4,4'-dihydroxy-diphenyl-1,2-ethane;
4,4'-dihydroxy-diphenyl-1,10-n-decane;
4,4'-dihydroxy-diphenyl-1,6(1,6-dioxo-n-hexane);
4,4'-dihydroxy-diphenyl-1,10(1,10-dioxo-n-decane);
bis-p-hydroxy-phenylether-4,4'-biphenyl;
a,a,a'-tetramethyl-a,a'-(di-p-hydroxyphenyl)-p-hydroxyphenyl)-p-xylylene;
a,a,a',a'-tetramethyl-a,a'-(di-p-hydroxyphenyl)-m-xylylene;
4,4'-dihydroxy-3,3'-dimethyl-diphenyl methane;
4,4'-dihydroxy-2,2'-dimethyl-diphenyl methane;
4,4'-dihydroxy-3,3'-dichloro-diphenyl methane;
4,4'-dihydroxy-3,3'-dimethoxy-diphenyl methane;
4,4'-dihydroxy-2,2',5,5'-tetramethyl-diphenyl methane;
4,4'-dihydroxy-2,2'-dimethyl-5,5'-diisopropyldiphenyl methane;
4,4'-dihydroxy-2,2'-dimethyl-5,5'-dipropyl-diphenyl methane;
4,4'-dihydroxy-diphenyl-5,5-nonane;
4,4'-dihydroxy-diphenyl-6,6-undecane;
4,4'-dihydroxy-diphenyl-3,3-butanone-2;
4,4'-dihydroxy-diphenyl-4,4-hexanone-3;
4,4'-dihydroxy-diphenylmethyl-4-methoxyphenyl methane;
4,4'-dihydroxy-diphenyl ether;
4,4'-dihydroxy-diphenyl sulfide;
4,4'-dihydroxy-3,3'-dimethyldiphenyl sulfide;
4,4'-dihydroxy-diphenyl sulfoxide;
4,4'-dihydroxy-diphenyl sulfone;
4,4'-dihydroxy-3,3'-dichlorodiphenyl sulfone;
2,2-bis(4-hydroxy-phenyl)-1-chloroethylene;
2,2-bis(4-hydroxy-phenyl)-1,1-dichloroethylene; and
2,2-bis(4-hydroxy-phenyl)-1,1-dibromoethylene, etc.

SH-dihydroxy aromatic compounds that are optionally employed in the practice of this invention are described in greater detail in U.S. application Ser. No. 254,814 of John R. Campbell, which—for purposes of brevity—are incorporated herein in their entirety by reference. Some specific examples of some SH-bisphenols (hereinafter also referred to as "SH-dihydric phenols" or as "SH-dihydroxy aromatic compounds") follow:

1,1-bis(4-hydroxy-3,5-dimethylphenyl) methane;
2,4'-dihydroxy-3,3',5,5'-tetramethyldiphenyl methane;
1,1-bis(3,5-diethyl-4-hydroxyphenyl) methane;
1,1-bis(3,5-diisopropyl-4-hydroxyphenyl) methane;
1,1-bis(3,5-dibromo-4-hydroxyphenyl) methane;
1,1-bis(3,5-dimethyl-4-hydroxyphenyl) ethane;
1,1-bis(3-methyl-5-ethyl-4-hydroxyphenyl) ethane;
1,1-bis(3,5-diethyl-4-hydroxyphenyl) ethane;
2,2-bis(3-methyl-5-ethyl-4-hydroxyphenyl) propane;
2,2-bis(3,5-dibromo-4-hydroxyphenyl) propane;
2,2-bis(3,5-diisopropyl-4-hydroxyphenyl) propane;
2,2-bis(4-hydroxy-3,5-dimethylphenyl) propane;
2,2-bis(3,5-dibromo-4-hydroxyphenyl) butane;
2,4'-dihydroxy-3,3',5,'5'-tetramethylbenzophenone;
4,4'-dihydroxy-3,3',5,5'-tetraethyldiphenyl sulfone;
4,4'-dihydroxy-3,3',5,5'-tetrabutyldiphenyl sulfide;
4,4'-dihydroxy-3,3',5,5'-tetramethyldiphenyl ether;
4,4'-dihydroxy-3,3',5,5'-tetrapropyldiphenyl sulfoxide;
2,2-bis(3,5-dimethyl-4-hydroxyphenyl)-1-chloroethylene;
2,2-bis(3,5-dimethyl-4-hydroxyphenyl)-1,1-dichloroethylene; and
2,2-bis(3,5-dibutoxy-4-hydroxyphenyl)-1,1-dibromoethylene, etc.

The non-sterically-hindered aromatic polycarbonates prepared by the process of this invention may be illustrated by formula (II) set out hereafter:

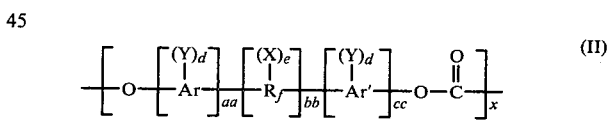

wherein $R_f$, Ar, Ar', Y, d, X, e, aa, bb, and cc are as defined above and x is a number of at least 10, preferably from 20 to 200 or higher, and often more preferably from 30 to 100.

Presently preferred non-sterically-hindered aromatic polycarbonate segments are illustrated by the formulas:

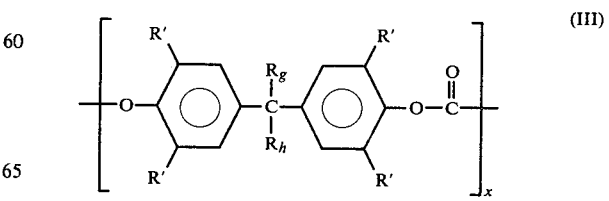

and

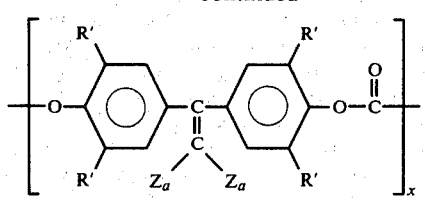

(IV)

where independently each R' is hydrogen, bromine, chlorine or a $C_{1-4}$ alkyl or alkoxy group, $R_g$ and $R_h$ are hydrogen or a $C_{1-2}$ alkyl group, each $Z_a$ is hydrogen, chlorine or bromine, subject to the proviso that at least one $Z_a$ is chlorine or bromine, and x is as previously defined.

The expression "carbonyl halides" as employed herein and in the claims includes carbonyl dichloride—more commonly known as phosgene, carbonyl dibromide, carbonyl diiodide, carbonyl difluoride, carbonylchlorofluoride, including mixtures thereof.

Any inert organic solvent can be used including non to medium polar solvents such as heptane, benzene, toluene, xylene, chlorobenzene, bromobenzene, orthodichlorobenzene, methylene chloride, 1,2-dichloroethane, iodobenzene, etc. and mixtures thereof. Preferably the solvents employed are halogenated hydrocarbons, more preferably methylene chloride.

Optionally, however, not essential to the practice of this invention a phase transfer agent can be employed. Illustrative of phase transfer agents are compounds known as quaternary ammonium, quaternary phosphonium and tertiary sulfonium compounds or mixtures thereof are described in detail by C. M. Stark in J.A.C.S. 93, (1971) and U.S. Pat. No. 4,201,721 whose descriptions are incorporated herein in their entirety by reference.

The interfacial polycondensation is carried out in any strongly basic reaction medium, i.e., pH 11 or higher, provided by the presence of a strong base, including mixtures thereof. Representative of basic species which can be employed are the following: basic quaternary ammonium, quaternary phosphonium or tertiary sulfonium hydroxide; alkali metal hydroxides; etc. Specific examples are tetramethyl ammonium hydroxide, tetraethyl phosphonium hydroxide, etc.; the lithium, sodium and potassium hydroxides; etc. Especially preferred are sodium or potassium hydroxide.

The process parameter related to pH is maintained throughout the course of the reaction, by any means, such as, optionally, by the initial addition of large excesses of alkali metal hydroxide including the substantially continuous addition of alkali metal hydroxide during the course of the reaction, e.g., concurrently with the carbonyl halide addition.

Any amount of functionally reactive dihydric aromatic compound and carbonyl halide can be employed. Generally, the carbonyl halide is present in stoichiometric amounts at least sufficient to react with the hydroxy groups associated with the dihydroxy compound. Preferably, the carbonyl halide is present in excess, i.e., in amounts of at least about 1.01 to 1.5 times, and more preferably from about 1.05 to about 1.15 times the stoichiometric amounts required to completely couple all of the reactive aromatic dihydroxy compounds to form the desired aromatic polycarbonates.

Any amount of base can be employed subject to the proviso that the agitated two-phase mixture is maintained at a pH value in excess of about 11, preferably within the range of 12–13.5, and optionally, as high as 14. Generally effective mol proportions of base relative to the aromatic dihydroxy compounds are within the range of from about 2:1 to 5:1, and frequently preferably from about 2.1:1 to 2.5:1.

The reactions can be carried out at any temperature, e.g., temperatures up to the reflux temperature of the inert organic solvent phase. Preferably, temperatures within the range of about 5° to 40° C. or even higher, and more preferably from 15° to 25° C. are employed.

The best mode of practicing this invention is set out in the examples hereinafter.

EXAMPLE 1

A 1000 ml. flask equipped with a mechanical stirrer, pH electrode, condenser having a nitrogen tee, a caustic aqueous sodium hydroxide addition funnel, and a phosgene inlet tube was flushed with nitrogen and charged with 350 ml. of deionized water, 36 ml. of methylene chloride, 56 g. of bis(4-hydroxyphenyl)propane-2,2, i.e., bisphenol-A also referred to herein as "BPA", and 88 ml. of a 25% (w/v) aqueous sodium hydroxide solution. The pH during the course of the reaction was 12.3. The reaction temperature was maintained at 10° C. Phosgene was introduced from a calibrated flow meter at 1.0 g. per minute. After 16 minutes the phosgene flow was stopped and the bisphenol-A polycarbonate polymer granules were filtered, washed with dilute hydrochloric acid (100 ml. of a 3% w/v solution) and 200 ml. of deionized water. The resulting polymer powder was dried at 80° C. under vacuum overnight. The polymer had an intrinsic viscosity $[\eta]$ of 0.15 dl./g. measured in chloroform at 25° C.

EXAMPLE 2

A 3000 ml. flask equipped with a mechanical stirrer, pH electrode, condenser having a nitrogen tee, a caustic aqueous sodium hydroxide addition funnel, and a phosgene inlet tube was flushed with nitrogen and charged with 1610 ml. of deionized water, 96.8 ml. of methylene chloride, 228 g. of bis(4-hydroxyphenyl)propane-2,2, 1.05 g. of phenol—a chain-stopper, and 210 ml. of a 50% (w/v) aqueous sodium hydroxide solution. The pH during the course of the reaction was initially 12.9 and varied up to a maximum of 13.5. The reaction temperature was maintained at 10° C. Phosgene was introduced from a calibrated flow meter at 1.9 g. per minute. After 60 minutes the phosgene flow was stopped and the bisphenol-A polycarbonate polymer granules were filtered, washed with dilute hydrochloric acid (100 ml. of a 3% w/v solution) and 200 ml. of deionized water. The resulting polymer powder was dried at 80° C. under vacuum overnight. The polymer had an intrinsic viscosity $[\eta]$ of 0.34 dl./g. measured in chloroform at 25° C.

In general, the use of the interfacial process of this invention provides advantages not associated with interfacial processes described in the prior art. These process advantages include:

(1) The elimination of the need for a polycondensation catalyst, (2) The use of substantially reduced amounts of liquid phase organic solvent, e.g., this process requires 1/20 (5%) to 4/10 (40%) of the amount of organic solvent normally required in otherwise similar aromatic polycarbonate processes, (3) The elimination or reduction in the use of anti-solvents and/or other means such as steam precipitation techniques to recover any polycarbonate in solution in the organic phase from the organic phase, (4) The formation of an in-situ aqueous phase polycarbonate precipitate in particulate form, e.g., fine particles of from 20 to 1000 microns to granules of from 1 to 3 mm., and (5) the recovery of aromatic polycarbonate powders of high bulk density, e.g., bulk densities as high as 0.50 g./cc.

The aromatic polycarbonates derived from this process, preferably, exhibit an intrinsic viscosity of at least 0.3, and more preferably about 0.5 deciliters per gram (dl./g) as measured in either methylene chloride or chloroform or similar solvent systems at 25° C. The upper intrinsic viscosity number is not critical, however, will generally be about 1.5 dl./g. Especially useful NSH-polycarbonates generally have intrinsic viscosities within the range of from about 0.38 to about 0.7 dl./g. Preferably, the polycarbonates have a number average molecular weight of at least about 5000, and more preferably from about 10,000 to about 50,000 or higher. Polycarbonates of such molecular weight characteristics process easily in between about 450° F. and 650° F., and are generally suitable raw materials for the manufacture of filaments, fibers, films, sheets, laminates, and other thermoplastic articles of manufacture including reinforced articles employing conventional molding, extruding, etc., manufacturing techniques.

I claim:

1. An improved interfacial polycondensation polycarbonate process wherein at least one dihydric phenol is reacted with a carbonyl halide the improvement comprising performing the process in the absence of a polycondensation catalyst and in accordance with the following process sequence and parameters:
   (1) forming an equilibrated substantially uniform agitated two-phase admixture containing
       (i) an organic phase containing an inert solvent,
       (ii) an aqueous phase containing dissolved therein an aromatic dihydroxy compound, a strong base, and having a pH of at least about 11, subject to the proviso that,
           (a) the volume ratio of inert organic solvent phase to aqueous phase is within the range of from 0.04:1 to 0.20:1, and
           (b) the mol ratio of base to aromatic dihydroxy compound is at least about 0.25:1,
   (2) adding and reacting a carbonyl halide with the aromatic dihydroxy compound to form an aromatic polycarbonate having a $\overline{M}_w$ of at least about 2000 as determined by gel permeation chromatography and an $\overline{M}_w/\overline{M}_n$ of less than about 6.0, and
   (3) separating and recovering the solid aromatic polycarbonate particulate from the liquid aqueous phase.

2. The claim 1 process wherein the aromatic dihydroxy compound has the formula:

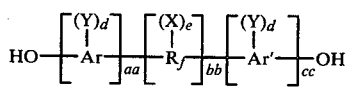

where $R_f$ is an alkylene, alkylidene, cycloalkylene, cycloalkylidene or arylene linkage or a mixture thereof, a linkage selected from the group consisting of ether, carbonyl, amine, a sulfur or phosphorous containing linkage, Ar and Ar' are arene radicals, Y is bromine, chlorine or a monovalent alkyl or alkoxy group, each d represents a whole number replaceable hydrogens substituted on the aromatic rings comprising Ar or Ar', subject to the proviso that when d is equal to two or more, no more than one Y group is ortho-positioned relative to an —OH group, X is bromine, chlorine or a monovalent hydrocarbon group selected from the class consisting of alkyl, aryl, cycloalkyl and mixtures thereof, e represents a whole number of from 0 to a maximum equivalent to the number of replaceable hydrogens on $R_f$, aa, bb and cc represent whole numbers including 0, when bb is not zero, neither aa or cc are zero, otherwise either aa or cc but not both are 0, when bb is zero, the aromatic groups are joined by a direct carbon bond.

3. The claim 2 process wherein the dihydric phenol is of the formulas:

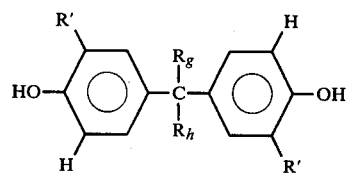

or,

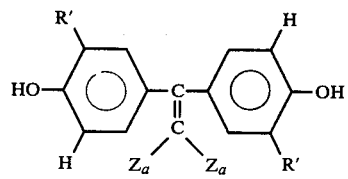

where independently each R' is hydrogen, bromine, chlorine or a $C_{1-4}$ alkyl or alkoxy group, $R_g$ and $R_h$ are hydrogen or a $C_{1-2}$ alkyl group, each $Z_a$ is hydrogen, chlorine or bromine, subject to the proviso that at least one $Z_a$ is chlorine or bromine.

4. The claim 3 process wherein a non-sterically-hindered aromatic dihydroxy compound is present as a major portion relative to a minor portion of a sterically-hindered aromatic dihydroxy compound.

5. The claim 4 process wherein the non-sterically-hindered aromatic dihydroxy compound portion is at least 90 mol percent.

6. The claim 5 process wherein the non-sterically-hindered dihydroxy compound is bis(4-hydroxyphenyl)-propane-2,2, and the base is an alkali metal hydroxide.

7. The claim 6 process wherein the bis(4-hydroxyphenyl)-propane-2,2 portion is 100 mol percent, the inert solvent is methylene chloride, the chain stopper is phenol, the alkali metal hydroxide is sodium hydroxide, the aqueous phase pH is within the range of from 11.0 to 14.0, the mol ratio of sodium hydroxide to bisphenol-A within the range of from about 1:1 to 2.5:1, the aromatic polycarbonate has an $\overline{M}_w$ within the range of from 5,000 to 100,000 as determined by gel permeation chromatography, and an $\overline{M}_w/\overline{M}_n$ ratio within the range of from about 2.75 to 3.75.

8. The claim 6 process wherein the pH range is at least about 12.

9. The claim 7 process wherein the bisphenol-A polycarbonate has an average particle size within the range of from about 20 microns to about 3 mm.

10. The process of claim 1 wherein said organic phase also contains a chain stopper.

* * * * *